(12) United States Patent
Everest et al.

(10) Patent No.: US 7,385,513 B2
(45) Date of Patent: Jun. 10, 2008

(54) DEVICE FOR MONITORING AND MEASURING DISTANCE

(76) Inventors: A. Wallace Everest, 305 Island Dr., Melbourne Beach, FL (US) 32951; Mark B. Godfrey, 5335 Pina Vista, Melbourne, FL (US) 32934; Mark A. Voves, 24861 110th St., Cresco, IA (US) 52136

( * ) Notice: Subject to any disclaimer, the term of this patent is extended or adjusted under 35 U.S.C. 154(b) by 165 days.

(21) Appl. No.: 11/044,104

(22) Filed: Jan. 27, 2005

(65) Prior Publication Data

US 2006/0176178 A1    Aug. 10, 2006

(51) Int. Cl.
*G08B 23/00*    (2006.01)
*G01F 17/00*    (2006.01)
*G01S 13/08*    (2006.01)

(52) U.S. Cl. .................. 340/573.1; 701/301; 342/118; 342/134; 342/135

(58) Field of Classification Search .................... None
See application file for complete search history.

(56) References Cited

U.S. PATENT DOCUMENTS

| | | | |
|---|---|---|---|
| 4,899,135 A | 2/1990 | Gharhariiran | |
| 4,967,695 A | 11/1990 | Giunta | |
| 5,241,923 A | 9/1993 | Janning | |
| 5,636,597 A * | 6/1997 | Van Curen et al. | 119/720 |
| 5,661,460 A * | 8/1997 | Sallen et al. | 340/573.4 |
| 5,794,569 A * | 8/1998 | Titus et al. | 119/721 |
| 5,812,056 A | 9/1998 | Law | |
| 5,819,198 A | 10/1998 | Peretz | |
| 5,939,988 A * | 8/1999 | Neyhart | 340/573.4 |
| 6,067,018 A | 5/2000 | Skelton et al. | |
| 6,078,260 A * | 6/2000 | Desch | 340/573.1 |
| 6,104,337 A | 8/2000 | Coutts et al. | |
| 6,326,891 B1 | 12/2001 | Lin | |
| 6,529,131 B2 * | 3/2003 | Wentworth | 340/573.1 |
| 6,620,057 B1 | 9/2003 | Pirritano et al. | |
| 6,714,132 B2 | 3/2004 | Edwards et al. | |
| 6,744,398 B1 | 6/2004 | Pyner et al. | |
| 7,061,369 B2 * | 6/2006 | Bergerhoff | 340/5.61 |
| 2004/0046658 A1 | 3/2004 | Turner et al. | |

* cited by examiner

*Primary Examiner*—Julie Lieu

(57) ABSTRACT

A device for monitoring distances having an interrogator and a transponder in wireless communication with the interrogator, the transponder having a signaling device that is activated based on the distance between the interrogator and transponders. The interrogator sends an encoded signal to the transponder and determines the distance to the transponder based on the delay of the transponder's response. The interrogator instructs the transponder to activate a signaling device when the distance exceeds a predetermined setting. The present invention is directed towards applications that require one-foot precision and accuracy.

4 Claims, 7 Drawing Sheets

DEVICE FOR MONITORING AND MEASURING DISTANCE

BACKGROUND OF THE INVENTION

The present invention relates to electromagnetic transponding devices and, more particularly, a device for monitoring and measuring distance.

Electromagnetic transponding devices having receivers and transmitters are well known in the art. One specific application for such devices is for training dogs and other pets to remain within a certain bounded area without the need for fences or other physical structures. For example, U.S. Pat. No. 4,967,695 to Giunta discloses a system for controlling the movement of dogs having a loop of wire that serves as a transmitting antenna and defines the boundary of the desired area. Giunta further discloses a receiver attached to the dog's collar that produces a signal, such as an electric shock, when the dog moves into the vicinity of the loop of wire. The Giunta device determines when the dog is in the vicinity of the loop by comparing the magnitude of the received signal. Specifically, as the dog moves closer to the loop of wire, the magnitude of the signal increases. When the magnitude reaches a certain threshold, the dog is considered to be within the vicinity of the loop, and the receiver produces the electric shock or similar signal.

This type of monitoring is in a class called 'amplitude detection'. The detected proximity of the units is based upon the strength of the transmitter and sensitivity of the receiver. The accuracy and precision of the measured distance is a percentage of the total range of the system.

The disadvantage with conventional systems such as that disclosed by Giunta and others is that installation and set up is labor intensive and time consuming. Specifically, a trench must be dug around the perimeter of the desired area, and a wire loop must be installed. Additionally, the receiver must be programmed for the specific loop to set the desired boundaries. Also, the system is stationary and not designed for mobile use. Thus, there is a need in the art for an improved system for monitoring and controlling the movement of dogs and other animals.

A more accurate method of measurement is to detect the phase of a signal. For example, U.S. Pat. No. 5,661,460 to Sallen discloses a system that compares the received signal to a reference. However, this method is actually a time delay to a code epoch that is RF power-detected and does not include a quadrature phase to provide greater resolution and accuracy.

Additionally, there is a need for adapting such a system to be used with other applications, such as monitoring the location of children, properly placing road signs, and measuring distance on a golf course. Presently, most prior art systems rely on advanced technology including global positioning systems (GPS) to monitor the location of children or determine the proper position of a road sign. Other systems use laser beams which, when reflected off remote objects, can be used to monitor and measure distances. While these systems are very accurate, they require the use of expensive and sophisticated electronic equipment. Accordingly, there is a need in the art for a cost effective system of monitoring and measuring distances.

Therefore, a principal object of this invention is to provide a system that monitors and measures distance in a simplified manner.

Another object of the present invention is to provide a system that monitors and measures distance in a mobile situation.

Yet another object of this invention is to provide a system that monitors and measures distance for training and controlling the movement of dogs and other animals.

A further object of this invention is to provide a system that monitors and measures distance for safely monitoring the location of children.

Still a further object of this invention is to provide a system that monitors and measures distance for placing road signs and the like.

Also, an object of this invention is to provide a system that monitors and measures distances for applications that require one-foot precision and accuracy.

These and other objects will be apparent to those skilled in the art.

BRIEF SUMMARY OF THE INVENTION

A device for monitoring and measuring distance having an interrogator and a second transponder in wireless communication with the interrogator, the transponder having a signal device that is activated based on the distance between the interrogator and transponder. With the present invention, the interrogator sends an encoded signal to the transponder and determines the distance to the transponder based on the time for the phase delay of the transponder's response. When the distance exceeds a predetermined setting entered into the interrogator by the user, the interrogator instructs the transponder to activate the signal device. The signal device generates a signal, such as a vibration or a shock, and may generate multiple stimuli depending upon the predetermined settings. The device is applicable for applications that require one-foot precision and accuracy.

DESCRIPTION OF THE PREFERRED EMBODIMENTS OF THE INVENTION

Figure 1:
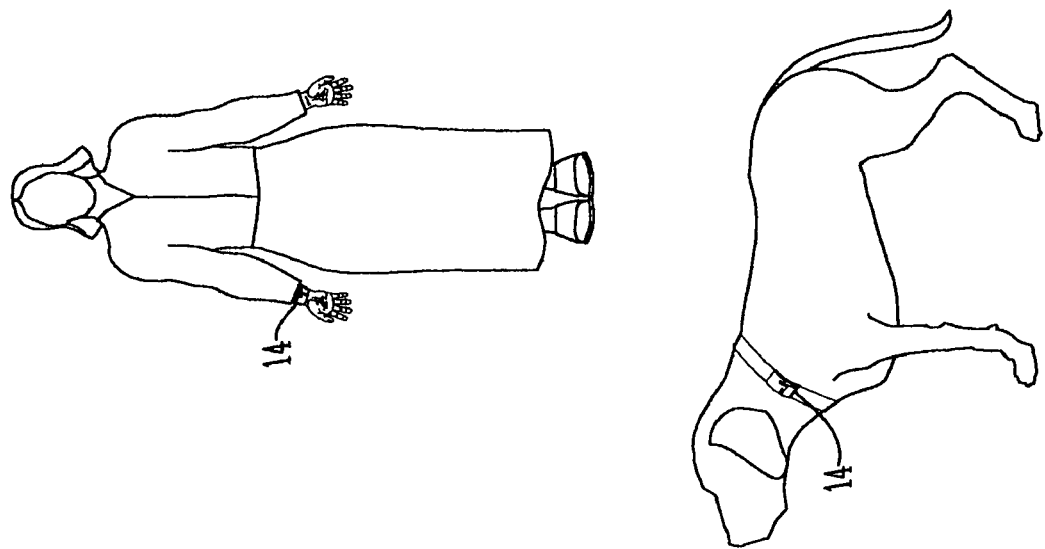
FIG. 1 depicts various applications of the present invention.
Figure 1:
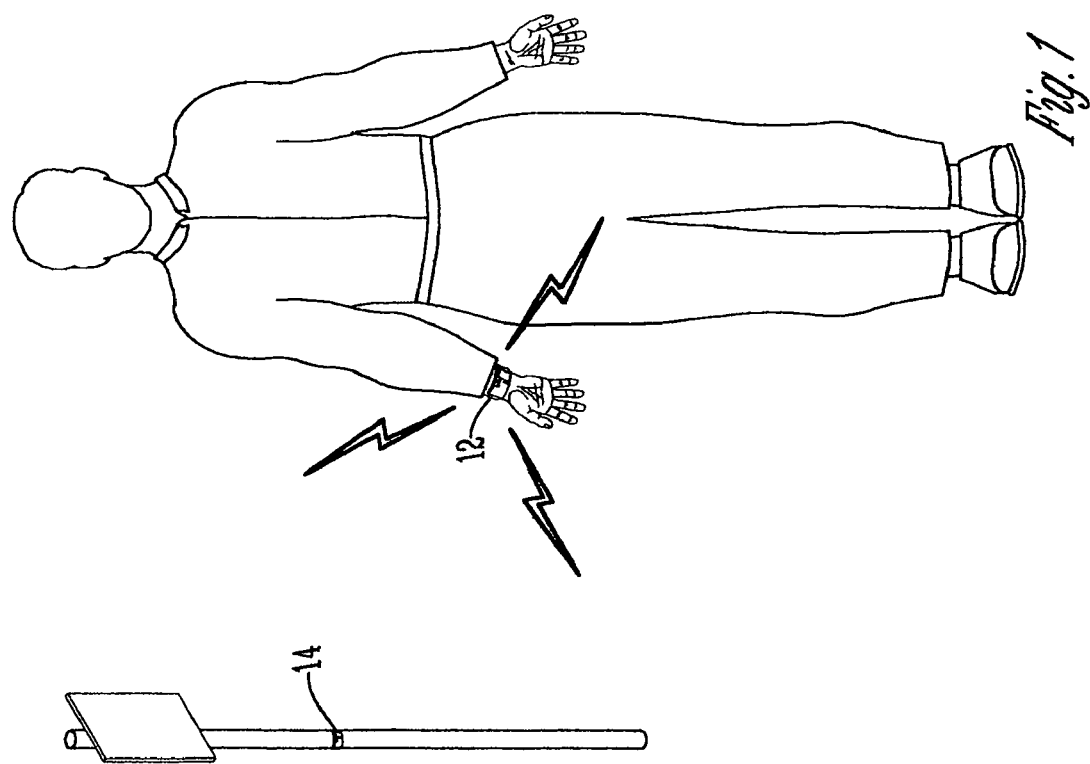
Figure 2:
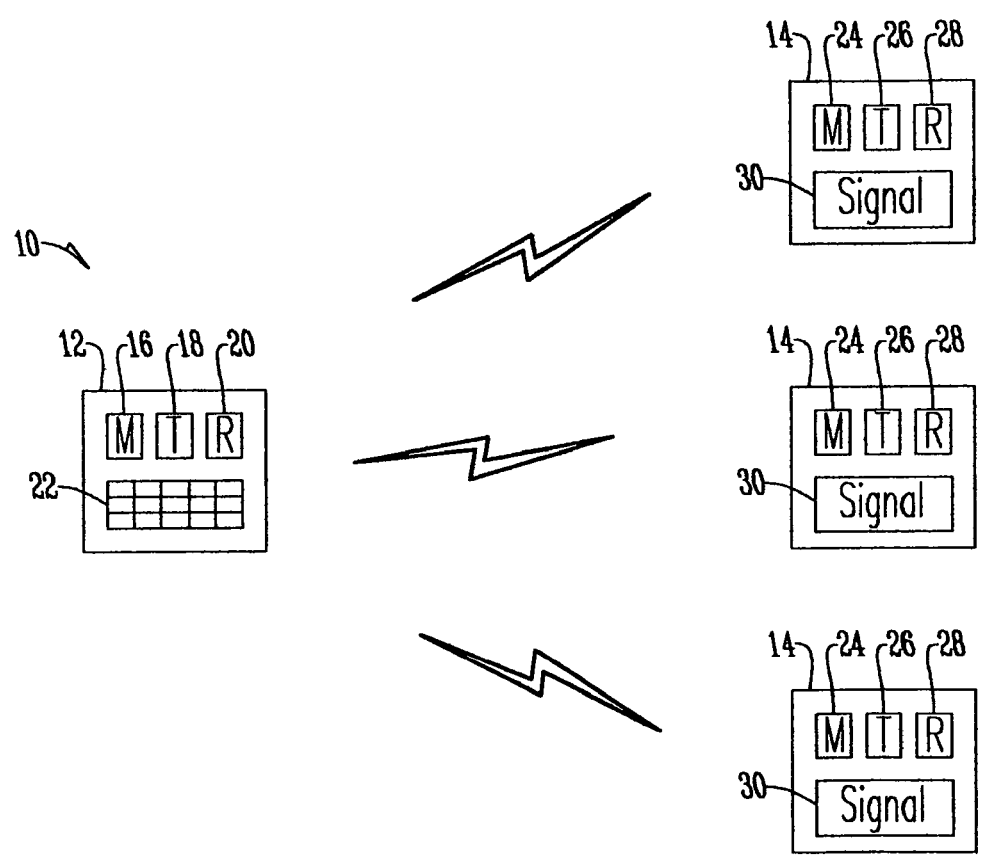
FIG. 2 is a plan view of an embodiment of the present invention.
Figure 3:
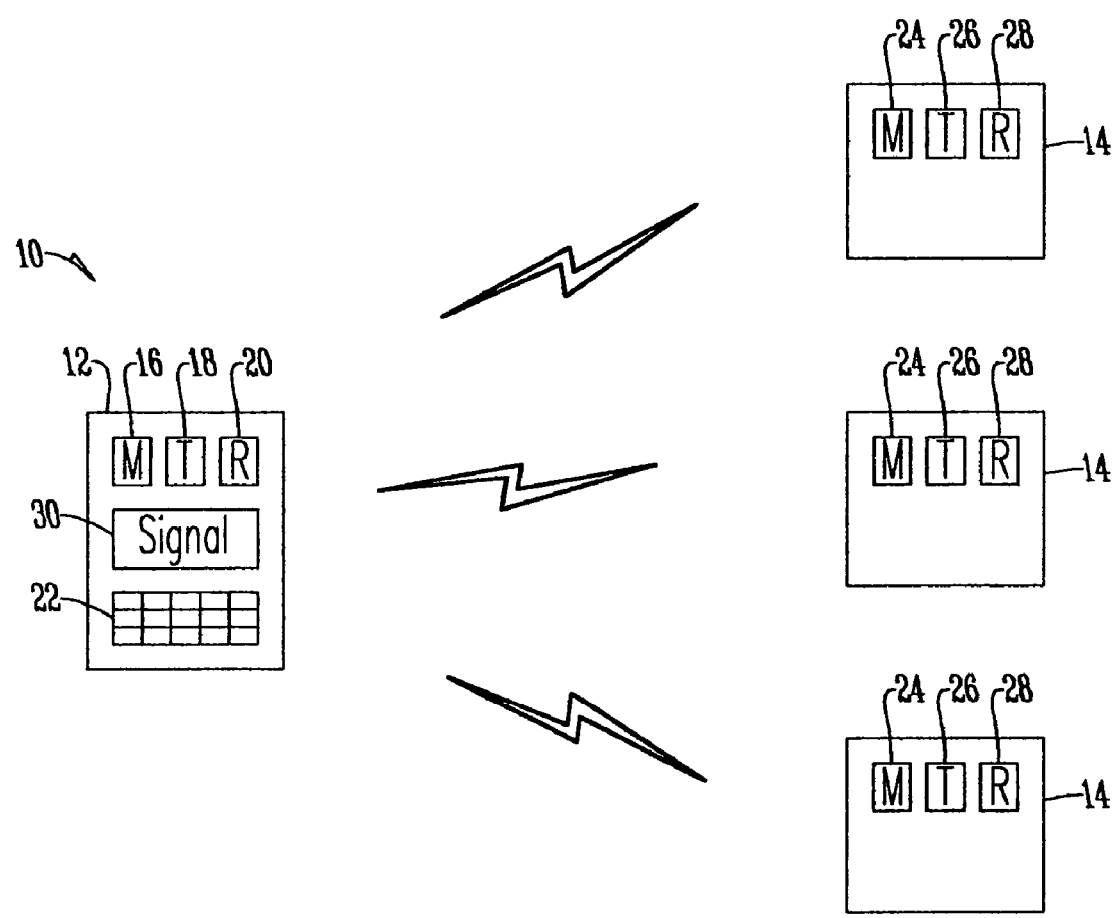
FIG. 3 is a plan view of an embodiment of the present invention.

With reference to FIGS. 1-3, a measuring device 10 is disclosed having an interrogator 12 and one or more transponders 14 in wireless communication with the interrogator. Interrogator 12 and transponder 14 preferably communicate using radio waves, but also may communicate via laser, infrared, or any other conventionally available electromagnetic signal. Interrogator 12 and transponder 14 are secured to bracelets or collars. Alternatively, interrogator 12 and transponder 14 are carried separately or incorporated into other electronic devices such as a cellular telephone. Interrogator 12 and transponder 14 may be stationary devices or used in a mobile setting as described hereafter.

Interrogator 12 has a microprocessor 16 for controlling a transmitter 18, receiver 20, and an input device 22, as shown in FIG. 2. Preferably, interrogator 12 is electronically configured as shown with detail in FIG. 4. The input device 22 preferably is a keypad allowing a user to enter a desired predetermined distance measurement. Alternatively, the input device 22 is a knob or any other conventional means of allowing the user to enter a desired predetermined distance measurement into the interrogator 12.

Transponder 14 also has a microprocessor 24 for controlling a transmitter 26, receiver 28, and signal device 30, as shown in FIG. 2. Preferably, transponder 14 is electronically configured as shown with detail in FIG. 5. Signal device 30, upon activation, generates one or more stimuli, including a shock or vibration. Alternatively, signal device 30 generates heat, light, an audio message or a verbal command. Signal device 30 optionally may include a display, such as a liquid crystal display (LCD) panel, such that signal device 30 may display a visual message. Additionally, signal device 30 may generate combinations of different types of stimuli, such as vibration and light, for example. While signal device 30 is shown as being a part of transponder 14 in FIG. 2, those skilled in the art will appreciate that the signal device also may be adapted for use with the interrogator 12, as shown in FIG. 3.

In operation, interrogator 12 sends an encoded signal to the transponder 14 via the transmitter 18. When multiple transponders 14 are used, as shown in FIG. 2, each transponder has a unique address. In this manner, the interrogator 12 is able to communicate individually with each transponder 14. Preferably, the interrogator 12 sends the encoded signal to the transponder 14 once per second, the signal preferably having a frequency in the range of 902 to 915 MHz. The transponder 14 receives the signal via receiver 28 and then rebroadcasts the same signal back to the interrogator 12 at a slightly different frequency via transmitter 26. Preferably, the transponder 14 rebroadcasts at a frequency in the range of 915 to 928 MHz. The interrogator 12 then uses the phase delay between signals to calculate the distance between the interrogator 12 and the transponders.

The interrogator 12 instructs the transponder 14 to activate the signal device 30 based on the determined distance. For example, once the microprocessor 16 determines the distance between the interrogator 12 and the transponder 14, the determined distance is compared with a pre-selected distance. When the determined distance is near or exceeds the predetermined distance, the microprocessor 16 instructs the transmitter 18 of the interrogator 12 to send a command signal to the transponder 14 instructing the transponder 14 to activate the signal device 30. The receiver 28 of the transponder 14 receives the command signal which is sent to microprocessor 24, which in turn activates the signal device 30. Additionally, a user may enter multiple predetermined distances into the input device 22 such that the signal device 30 generates a first signal when the first predetermined distance is exceeded, and generates subsequent signals at predetermined distances thereafter. As such, the signal device 30 may generate progressive signals, such as a vibration upon exceeding the first predetermined distance, followed by a shock after exceeding a second predetermined distance. In this manner, the signal device 30 varies the intensity of the signal as subsequent predetermined distances are exceeded, such as increasing the intensity of the vibration, shock, audio message, and the like.

The microprocessor 16 also may be programmed to vary the command signal based on the difference between the determined distance and predetermined distance. For example, when the predetermined distance is ten feet and the determined distance is eight feet, the interrogator 12 sends a command signal to the transponder 14 activating a voice command on the signal device 30. When the determined distance is nine and one-half feet, a command signal from the interrogator 12 is sent to the transponder 14 activating a mild vibration on the signal device 30. When the determined distance exceeds ten feet, a command signal is sent activating a shock on the signal device 30. In this manner, the intensity of the signal is programmed to increase based on the difference between the determined distance and the predetermined distance without setting a plurality of predetermined distances. Alternatively, when the signal device is mounted to the interrogator 12, the signal device 30 is activated by microprocessor 16 based on a comparison of the determined distance and the predetermined distance in the same manner as previously described.

The measuring device 10 is used in a number of applications as shown in FIG. 1, including but not limited to controlling the movement of a dog or other animal. In this application, the owner carries or wears the interrogator 12, and the transponder 14 is secured to a dog's collar. Additionally, a plurality of transponders 14 may be used with multiple dogs, thereby allowing the owner to train or monitor the location of multiple dogs. The owner then uses the input device 22 to enter a predetermined distance or set of distances into the interrogator 12, as discussed above. For example, the owner may enter a predetermined distance of fifty yards. As the dog wanders, the interrogator 12 monitors the location of the dog by communicating with the transponder 14. As the dog approaches the fifty-yard limit, the interrogator 12 instructs the transponder 14 to activate the signal device 30, which generates a signal such as a vibration or voice command. If the dog exceeds the fifty-yard limit, the signal device 30 generates a more intense signal, such as an electric shock. In this manner, the owner is allowed to focus his or her attention to the activity at hand, such as hunting or jogging, without having to keep track of dog.

Additionally, the interrogator 12 may be placed in a fixed or stationary location, such as in a charging cradle inside a house. With the transponder 14 secured to the dog's collar, the dog is free to move within the predetermined distance from the interrogator 12, thereby creating a virtual fence indoors or outside. In this manner, the device 10 assists in training the dog of a specific boundary without the need for fences or leashes.

Another application of measuring device 10 is safely monitoring the location of children. Similar to the above application, the parent carries or wears the interrogator 12, while the child carries or wears the transponder 14. However, in this specific application, the signal device 30 is incorporated within the interrogator 12 and not the transponder 14. In this application, the parent sets the predetermined distance on the interrogator 12 using the input device 22. The interrogator 12 then monitors the child's location by monitoring the distance between the interrogator 12 and the transponder 14. For example, the parent may enter a predetermined distance of fifty feet. As the child approaches the fifty-feet limit, the interrogator 12 activates the signal device 30 mounted thereon, which generates a signal, such as a vibration, to alert the parent. When the child exceeds the fifty-feet limit, the signal device 30 generates a more intense signal, such as an audio alert, to notify the parent that the child has exceeded the predetermined distance. Similar to the above application, the interrogator 12 may be programmed with multiple predetermined distances, such that the signal device 30 generates one signal once the first predetermined distance is exceeded, and then generates subsequent signals as the transponder 14 continues to move farther away from the interrogator 12. In this manner, a parent can safely monitor the location of a child and be alerted when the child wanders too far away from the parent.

Still another application for monitoring children is to display the measured distance to the child. A display within interrogator 12 is updated such that the parent can deduce if walking in a particular direction is bringing the child closer in proximity.

Still another application of measuring device 10 is for use with the placement of road signs, such as mile markers or the like. In this application, the interrogator 12 is stationary and the transponder 14 is mobile. Alternatively, the interrogator 12 is mobile and the transponder 14 is stationary. The user sets a predetermined distance into the stationary interrogator 12 using input device 22. For example, the user may enter a predetermined distance of one-tenth of a mile, as necessary to place mile marker signs. As the construction worker with the mobile transponder 14 moves away from the stationary transponder 12, the stationary transponder 12 monitors the location of the construction worker by determining the distance between the stationary interrogator 12 and mobile transponder 14. When the construction worker approaches the predetermined distance of one-tenth of a mile, the stationary interrogator 12 instructs the mobile transponder 14 to activate the signal device 30, which generates a signal such as a vibration to alert the construction that he or she is approaching the proper position for the mile marker sign. If the construction worker exceeds the one-tenth of a mile limit, the signal device 30 generates a signal, such as an audio command, notifying the construction worker that he or she has traveled too far. In this manner, the device 10 can be used to position road signs such as mile markers or the like in the appropriate position.

The device 10 may be used in a similar manner with other applications, such as golf, whereby the user can use the device 10 to measure distances between the golf ball and the cup. Specifically, the interrogator 12 may be mounted to the pin, while the transponder 14 is worn by the golfer or secured to the golfer's bag. As the golfer approaches the hole, the interrogator 12, which monitors the golfer's location via the transponder 14, instructs the transponder 14 to activate the signal device 30 mounted thereon. For example, the interrogator 12 may be programmed with multiple predetermined distances, such as 100, 200, and 300 yards. As the golfer walks down the fairway, the signal device 30 generates various signals based on the golfer's distance from the pin. The commands may be audio, announcing the golfer's distance from the pin as the golfer passes each predetermined limit. In this manner, the golfer knows how far he or she is from the hole so that the golfer can select the correct clubs or vary his or her swing to optimize the golfer's game.

It is therefore seen that by providing multiple interrogators 12 in wireless communication with multiple transponders 14, the present invention allows for the measurement of distances between transponders 14 based upon triangulation techniques.

Figure 4:
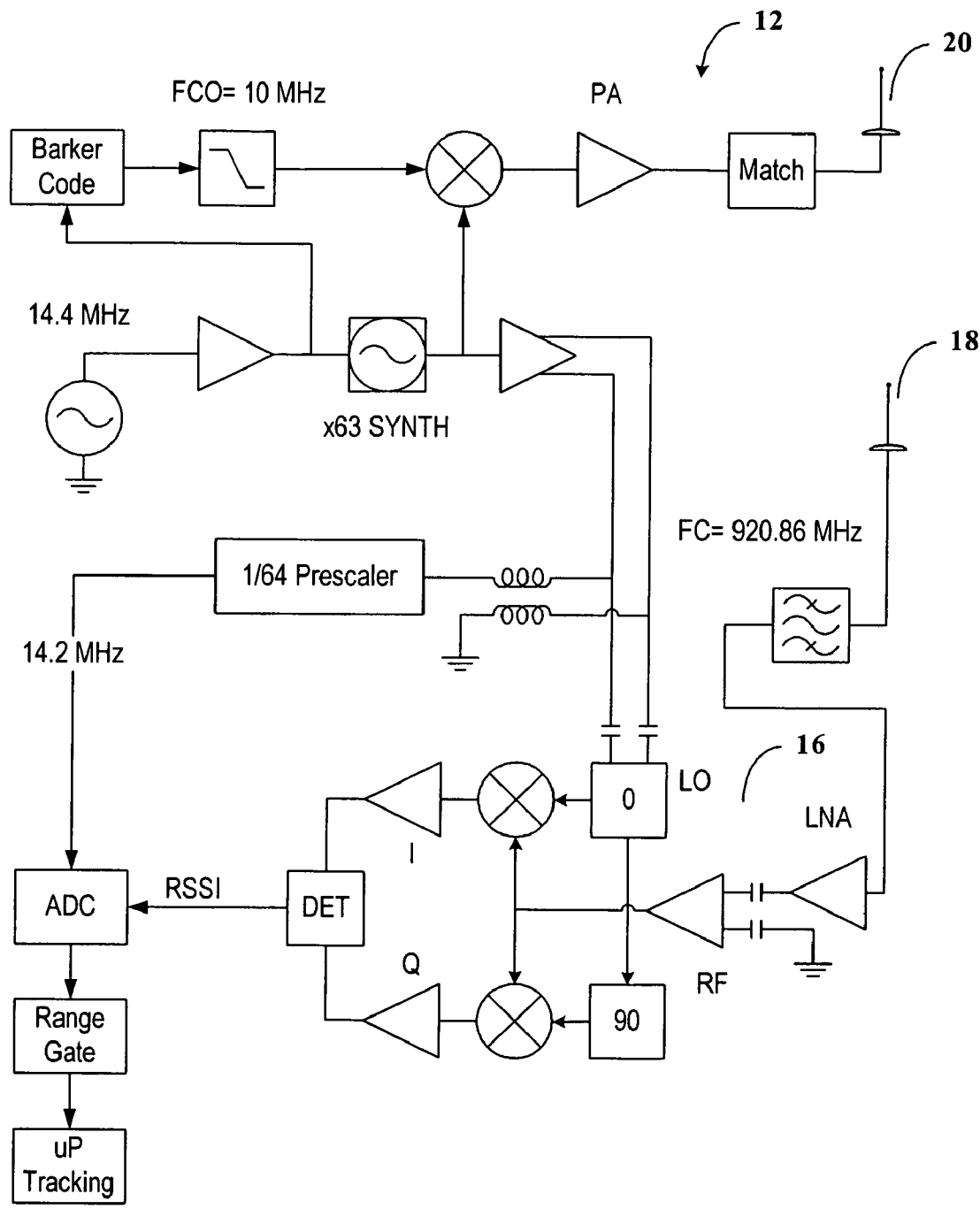
FIG. 4 is a schematic illustrating the circuitry of the interrogator of the present invention.

In exemplary embodiments of FIG. 4, the interrogator 12 is based upon a 14.45 MHz system clock. This clock generates both a pseudo-random digital sequence and the transmitter's 910.2 MHz RF carrier. The digital sequence is a 13-bit Barker code. The carrier is produced by a phase-locked loop that multiplies to system clock by sixty-three. The digital sequence and carrier are mixed to spread the RF bandwidth. Those with ordinary skill in the art will appreciate that other frequencies and digital sequences may be utilized without departing from the scope and intent of the present invention.

Figure 5:
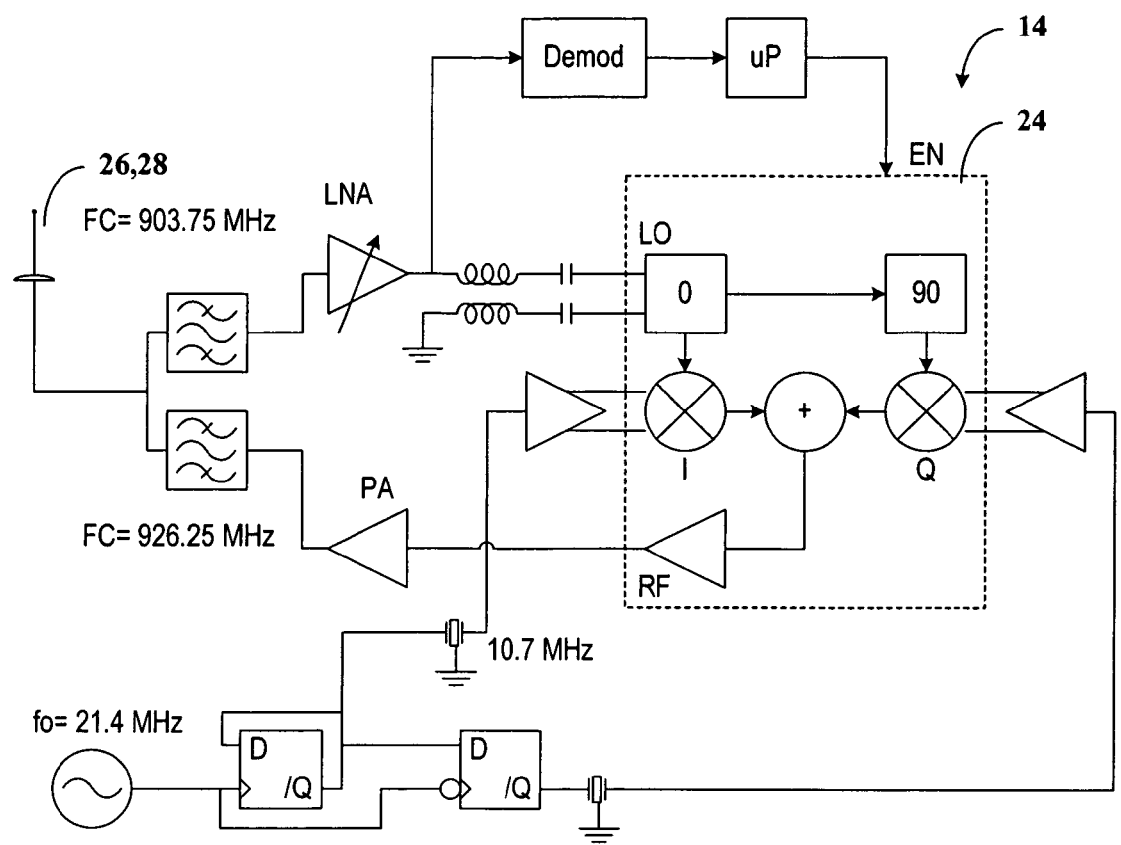
FIG. 5 is a schematic illustrating the circuitry of the transponder of the present invention.

In exemplary embodiments of FIG. 5, the transponder 14 receives an RF carrier at 910.2 MHz. A demodulator and microprocessor monitor the RF channel for an indicated pattern that addresses and selects the individual transponder. When selected, the microprocessor enables a quadrature mixer that re-transmits the received signal. The mixer is driven by 10.7 MHz quadrature oscillator. In this manner, only the upper side band is transmitted with an RF carrier of 920.9 MHz. The phase of the original RF carrier is preserved during this translation. Those with ordinary skill in the art will appreciate that other addressing methods, frequencies, and use of the lower side band may be employed without departing from the scope and intent of the present invention.

In exemplary embodiments of FIG. 4, the interrogator 12 receives an RF carrier at 920.9 MHz. Both the received signal and the original transmitter carrier drive a quadrature mixer. The Received Signal Strength Indication (RSSI) of both the in-phase and quadrature-phase signal components are detected.

To produce a 14.2 MHz sampling clock, the original transmitter carrier is divided by sixty-four. The RSSI is sampled at 14.2 MHz.

Figure 6:
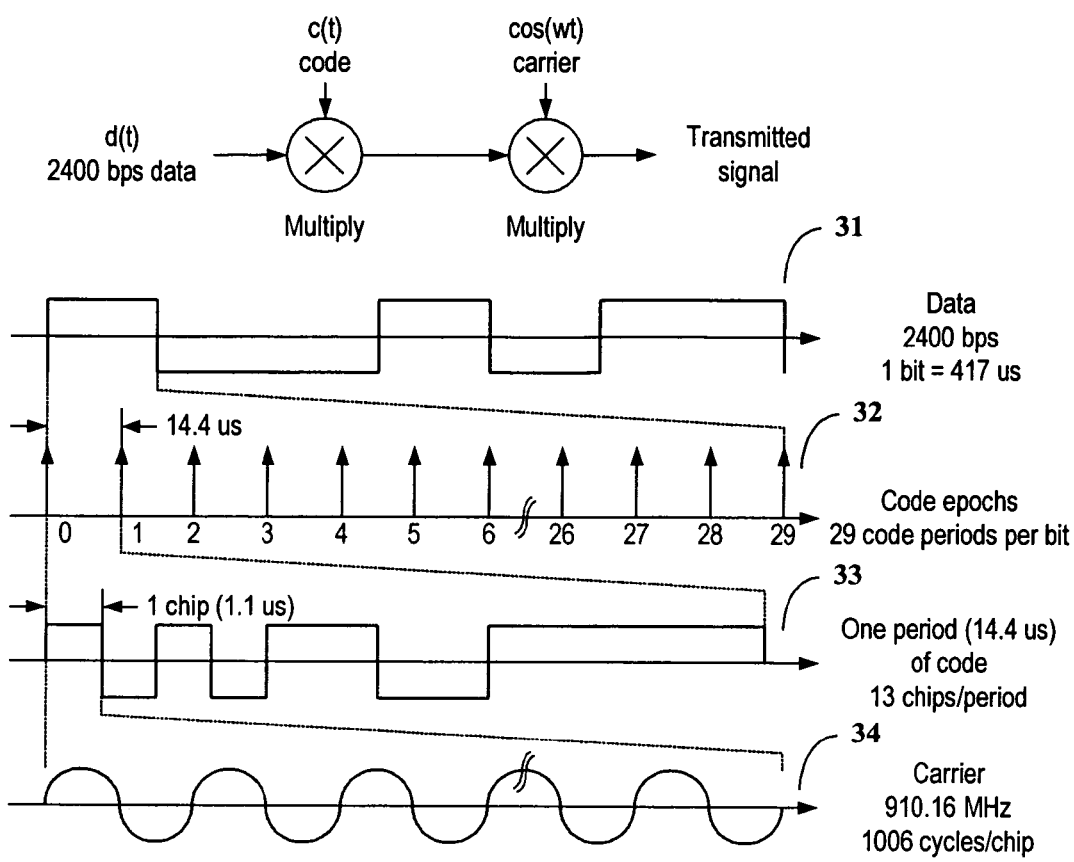
FIG. 6 illustrates the signal coding of an embodiment of the present invention.

In exemplary embodiments of FIG. 6, various coding layers are described. To produce the chip-rate of the digital spreading sequence, the 14.45 MHz system clock is divided by sixteen. This is equivalent to the 910.2 MHz carrier 34 divided by 1006. One period of the 13-bit code sequence 33 has a duration of 14.4 us. A repetition of twenty-nine code epochs 32 represents one bit of digital data. Digital data 31 is used to differentiate between similar interrogators. The data rate is 2400 bps. Those with ordinary skill in the art will appreciate that code multiples and data rates may be employed without departing from the scope and intent of the present invention.

Figure 7:
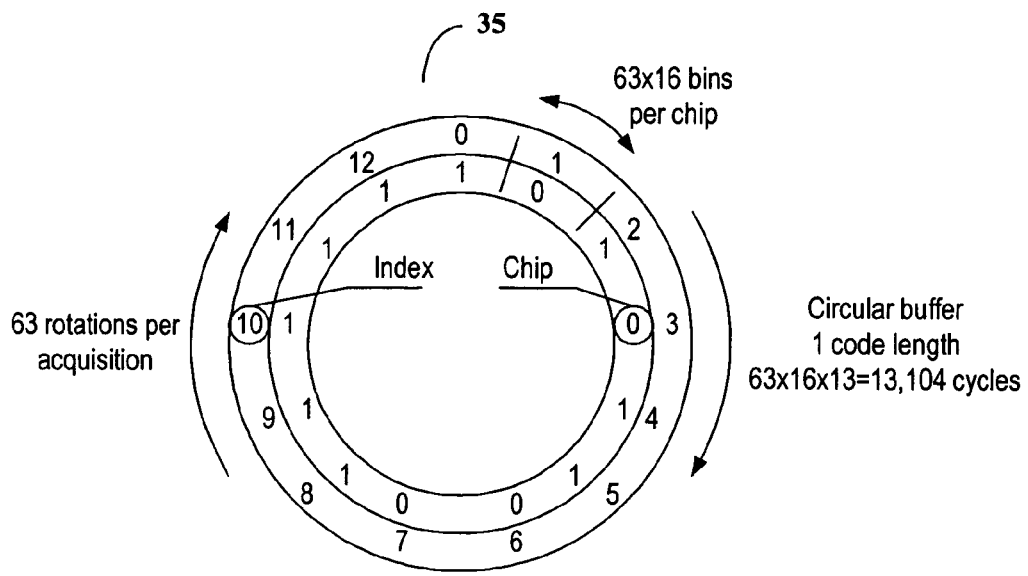
FIG. 7 illustrates the repetitive sampling method of an embodiment of the present invention.

In exemplary embodiments of FIG. 7, the interrogator 12 accumulates a circular buffer 35. The buffer has a size of 13,104 bins and is used to ascertain range information. The bins represent the RSSI that is sampled at 14.2 MHz. The index of the buffer is incremented by sixty-four after each sample. An acquisition is complete when the index has rotated around the circular buffer sixty-three times.

A second reference-buffer is envisioned that contains the original coded spreading sequence. The received buffer and reference code are compared as two circular rings. The phase rotation of the received buffer indicates the range distance.

Figure 8:
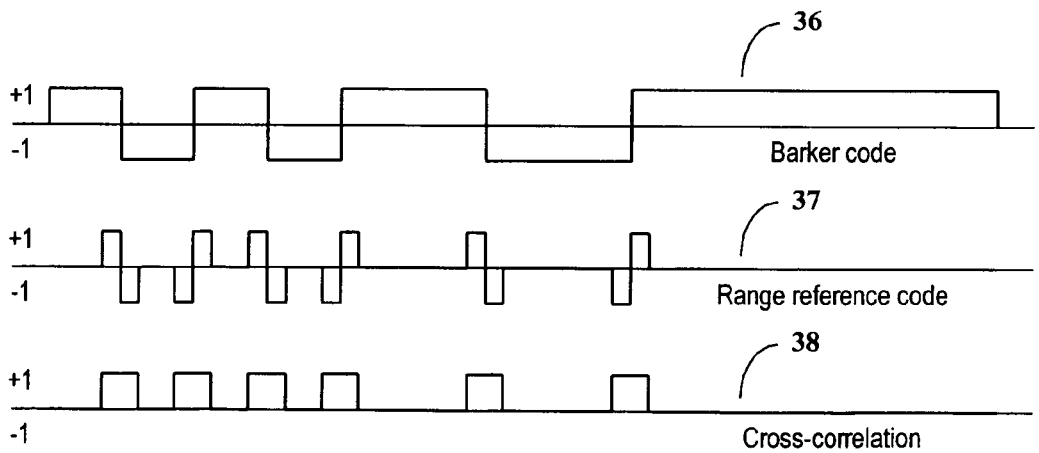
FIG. 8 illustrates the differential detection method of an embodiment of the present invention.

In exemplary embodiments of FIG. 8, a cross correlation is performed on the two buffers. A rotation/range estimate is tested as the received code 36 in the buffer. The reference code 37 is a differential pattern that favors edge detection of the correlation function. The cross correlation 38 produces a maximum response when the rotation estimate is aligned with the reference code.

The microprocessor within the interrogator 12 hunts for the strongest range correlation and initiates a tracking algorithm. A slow or stationary system may adapt the interrogation rate to conserve power and battery life.

What is claimed is:

1. A device for monitoring distance comprising:
an interrogator;
a transponder in wireless communication with the interrogator, the transponder having a signaling device;

the interrogator having a microprocessor that determines distance between the interrogator and the transponder; and the interrogator sending a command signal to the transponder that activates the signaling device when the determined distance nears a pre-determined distance;

wherein the interrogator sends an encoded signal to the transponder and determines the distance to the transponder based on the phase delay of the transponder's response;

wherein a digital spreading sequence is used with the interrogator to derive a distance measurement.

2. The device of claim 1 wherein the signaling device generates a signal selected from the group consisting of a vibration, shock, heat, light, audio, and visual display.

3. The device of claim 1 wherein the signaling device generates a plurality of signals based on the difference between the distance and the predetermined distance.

4. The device of claim 1 wherein the interrogator has an input device for setting a predetermined distance.

* * * * *